United States Patent
Miao et al.

(10) Patent No.: US 10,628,216 B2
(45) Date of Patent: Apr. 21, 2020

(54) I/O REQUEST SCHEDULING METHOD AND APPARATUS BY ADJUSTING QUEUE DEPTH ASSOCIATED WITH STORAGE DEVICE BASED ON HIGE OR LOW PRIORITY STATUS

(71) Applicant: Huawei Technologies Co., Ltd., Shenzhen (CN)

(72) Inventors: Xie Miao, Hangzhou (CN); Jiang Zhong, Shenzhen (CN); Kaixu Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/401,977

(22) Filed: May 2, 2019

(65) Prior Publication Data

US 2019/0258514 A1    Aug. 22, 2019

Related U.S. Application Data

(63) Continuation of application No. PCT/CN2017/108951, filed on Nov. 1, 2017.

(30) Foreign Application Priority Data

Nov. 2, 2016    (CN) .......................... 2016 1 0951240

(51) Int. Cl.
*G06F 9/00* (2006.01)
*G06F 9/48* (2006.01)
(Continued)

(52) U.S. Cl.
CPC .......... *G06F 9/4881* (2013.01); *G06F 9/3855* (2013.01); *G06F 9/48* (2013.01); *H04L 47/6255* (2013.01); *H04L 47/6275* (2013.01)

(58) Field of Classification Search
CPC ..................................................... G06F 9/4881
See application file for complete search history.

(56) References Cited

U.S. PATENT DOCUMENTS 10,127,744 B2 * 11/2018 Butler .................... G07C 11/00
2004/0194095 A1    9/2004 Lumb et al.
(Continued)

FOREIGN PATENT DOCUMENTS

CN    1825288 A    8/2006
CN    102799487 A    11/2012
(Continued)

OTHER PUBLICATIONS

Machine Translation and Abstract of Chinese Publication No. CN1825288, Aug. 30, 2006, 9 pages.
(Continued)

*Primary Examiner* — Tammara R Peyton
(74) *Attorney, Agent, or Firm* — Conley Rose, P.C.

(57) ABSTRACT

An I/O request scheduling method includes storing received I/O requests into a plurality of queues, where each queue corresponds to at least one process group, each process group includes one or more processes, and a received I/O request is stored into a queue corresponding to a process group to which a process corresponding to the I/O request belongs, and dispatching the I/O requests in the plurality of queues to an I/O device, where a quantity of I/O requests from a high-priority queue is greater than a quantity of I/O requests from a low-priority queue during one dispatching procedure.

17 Claims, 8 Drawing Sheets

(51) Int. Cl.
*G06F 9/38* (2018.01)
*H04L 12/863* (2013.01)
*H04L 12/865* (2013.01)

(56) References Cited

U.S. PATENT DOCUMENTS

| | | | |
|---|---|---|---|
| 2009/0259749 | A1 | 10/2009 | Barrett et al. |
| 2010/0191876 | A1 | 7/2010 | Muppirala et al. |
| 2011/0078696 | A1 | 3/2011 | Blackburn et al. |
| 2011/0119679 | A1 | 5/2011 | Muppirala et al. |
| 2013/0290656 | A1 | 10/2013 | Staelin et al. |
| 2013/0343398 | A1* | 12/2013 | Sarca .............. H04L 47/32 370/412 |
| 2018/0322431 | A1* | 11/2018 | Folck ............... G06Q 10/06316 |

FOREIGN PATENT DOCUMENTS

| CN | 102831014 A | 12/2012 |
|---|---|---|
| CN | 105320571 A | 2/2016 |
| CN | 106293917 A | 1/2017 |

OTHER PUBLICATIONS

Machine Translation and Abstract of Chinese Publication No. CN102799487, Nov. 28, 2012, 9 pages.
Machine Translation and Abstract of Chinese Publication No. CN102831014, Dec. 19, 2012, 12 pages.
Machine Translation and Abstract of Chinese Publication No. CN105320571, Feb. 10, 2016, 12 pages.
Machine Translation and Abstract of Chinese Publication No. CN106293917, Jan. 4, 2017, 10 pages.
Foreign Communication From a Counterpart Application, PCT Application No. PCT/CN2017/108951, English Translation of International Search Report dated Feb. 1, 2018, 2 pages.
Foreign Communication From a Counterpart Application, PCT Application No. PCT/CN2017/108951, English Translation of Written Opinion dated Feb. 1, 2018, 6 pages.
Foreign Communication From a Counterpart Application, European Application No. 17866432.2, Extended European Search Report dated Oct. 7, 2019, 7 pages.

* cited by examiner

I/O REQUEST SCHEDULING METHOD AND APPARATUS BY ADJUSTING QUEUE DEPTH ASSOCIATED WITH STORAGE DEVICE BASED ON HIGE OR LOW PRIORITY STATUS

CROSS-REFERENCE TO RELATED APPLICATIONS

This application is a continuation of International Application No. PCT/CN2017/108951, filed on Nov. 1, 2017, which claims priority to Chinese Patent 201610951240.9, filed on Nov. 2, 2016. The disclosures of the aforementioned applications are hereby incorporated by reference in their entireties.

TECHNICAL FIELD

The present disclosure relates to computer technologies, and in particular, to an input/output (I/O) request scheduling method and apparatus.

BACKGROUND

Currently, most mobile terminals use an operating system supporting multitasking. While a user is performing an operation on the foreground, another application, such as music playing or downloading from a network, can run on the background. If I/O operation requests (also referred to as I/O requests) corresponding to an application running on the background are frequently submitted, a large quantity of I/O resources are inevitably occupied. However, due to limited I/O resources of a computer system, if a foreground application needs to perform an I/O operation, a response speed of the I/O operation inevitably slows down because excessive I/O resources are occupied by the background application. From a perspective of a user, for example, it takes time to start the foreground application or an operation cannot be completed smoothly. This seriously affects foreground application user experience.

A Linux operating system provides various I/O scheduling policies such as No Operation (NOOP), Deadline, Completely Fair Scheduler (CFQ), and Row for different service scenarios. For example, in some service scenarios, an I/O speed of the entire system is increased by combining I/O operations. However, these scheduling policies provided by the LINUX system still cannot ensure an I/O response speed of a critical application (a foreground application) in a scenario of concurrent I/O requests from a plurality of applications. Because a non-critical application (a background application) may generate a large quantity of I/O requests, and a queue of a scheduler is congested by the I/O requests, an I/O request of the critical application cannot be executed in a timely manner.

SUMMARY

Embodiments of the present disclosure provide an I/O request scheduling method and apparatus to ensure an I/O response speed of a critical application running on a terminal device to some extent.

According to a first aspect, an embodiment of the present disclosure provides an I/O request scheduling method. The method may be implemented in an operating system as a functional module of the operating system, or may be implemented as a functional module independent of an operating system. The method includes storing a plurality of received I/O requests into a plurality of queues, where each queue corresponds to at least one process group, one process group includes one or more processes, and a received I/O request is stored into a queue corresponding to a process group to which a process corresponding to the I/O request belongs, and dispatching the I/O requests in the plurality of queues to an I/O device, where a quantity of I/O requests from a high-priority queue is greater than a quantity of I/O requests from a low-priority queue during one dispatching procedure. Further, a priority of a queue matches a characteristic of a process group corresponding to the queue.

Based on the first aspect, in some implementations, characteristic information of the process group includes importance information of the process group, and a priority of a queue corresponding to a high-importance process group is higher than a priority of a queue corresponding to a low-importance process group. Further, the importance information may include information about impact of one or more processes included in the process group on user experience, and a process group having great impact on user experience is more important than a process group having little impact on user experience.

An I/O request is a data input or output request sent by an upper layer of a storage to the storage. For example, an I/O read request is used to read data from the storage. For another example, an I/O write request is used to write data into the storage.

High and low priorities, as well as large and small quantities of I/O requests, are relative concepts. For example, there are two queues A and B. If a priority of A is higher than a priority of B, a quantity of I/O requests from A is greater than a quantity of I/O requests from B during one dispatching procedure. However, how much the priority of A is higher than the priority of B and how much the quantity of I/O requests from A is greater than the quantity of I/O requests from B are not limited. In addition, priorities of any two queues of the plurality of queues are not necessarily different in this embodiment of the present disclosure. For example, if there are three queues, priorities of two of the queues may be the same. In addition, one process group may be corresponding to a plurality of queues.

Processes included in each process group are processes of applications. In addition, some types of I/O requests are created by a kernel thread, not by an application process (or thread). Therefore, an independent queue may be further set to store these types of I/O requests such as an asynchronous write request. The kernel thread may not participate in process grouping of an application, and does not belong to any process group (therefore, in this implementation, not all queues are corresponding to a process group), or the kernel thread may be classified into an independent group.

A queue is a data structure in which data is processed on a first-in first-out basis. A specific implementation of the queue may be an array, a linked list, or the like. A size or depth of the queue means an amount of data that can be stored in the queue, such as a quantity of I/O requests that can be stored. Another data structure that can be used to implement the method provided in this embodiment of the present disclosure is also applicable.

The process group may also be referred to as an application group in some implementations. The process group or application group may be classified based on a running status of a process or an application (for example, running on the foreground or running on the background), impact of the process or the application on user experience, importance of the process or the application to a system, and the like. All processes of one application may be in a same group, or may be in different groups. When all processes of one application should to be set into one group, grouping may be directly performed based on applications. In this implementation, the first step of the method provided in this embodiment of the present disclosure may be alternatively storing a plurality of received I/O requests into a plurality of queues, where each queue corresponds to at least one application group, each application group includes one or more applications, and a received I/O request is stored into a queue corresponding to an application group to which an application generating the I/O request belongs.

During one dispatching procedure, the I/O requests may be obtained from all queues, or may be obtained from some of the queues.

Based on the first aspect, in some implementations, the "process corresponding to the I/O request" is a process creating the I/O request. For example, if an application requests to read data, a process of the application invokes a system call, and the process enters a file system layer of a kernel layer (also referred to as a kernel mode) from an application layer (also referred to as a user mode or a user layer) through the system call. The process looks up the data to be read in a cache of a file system. If the data is found, the process directly copies the data into a buffer of the process, exits the kernel layer, and returns to the application layer. If the data is not found, the process creates an I/O read request at the file system layer and submits the I/O read request to a block device layer ("block layer"). In this case, a process corresponding to the I/O read request is the process creating the I/O read request. The block layer dispatches the I/O read request based on a priority of a process group to which the process belongs. A correspondence between a process and an I/O request is sometimes briefly described as an "I/O request of a process" when the I/O request is described in this application. Although an I/O request is generated by an application process, for ease of reading, the I/O request is sometimes described as "an I/O request generated by an application X" or "an I/O request of an application X", where X represents any application.

Based on any one of the first aspect or the foregoing implementations, in some implementations, a priority of a queue is represented by a priority identifier. A priority may be identified using a value, and a larger value indicates a lower priority of the queue (or vice versa). In some cases, the priority may be alternatively identified using another type of parameter.

Based on any one of the first aspect or the foregoing implementations, in other implementations, a priority of a queue is represented by a weight or a weight value that is configured for each queue, and a weight value of a high-priority queue is greater than a weight value of a low-priority queue. In an embodiment, during I/O request dispatching, an I/O request is obtained from each queue based on a weight value of each queue. For example, weights of queues A and B are a and b, respectively, where a and b are both less than 1 and greater than 0, a is greater than b, and a+b=1. During one dispatching procedure, if X I/O requests are to be dispatched, X*a I/O requests and X*b I/O requests are obtained from A and B, respectively (where * indicates a multiplication sign).

Based on any one of the first aspect or the foregoing implementations, in other implementations, priorities of a plurality of queues and a quantity of to-be-dispatched I/O requests are implemented by setting a to-be-dispatched I/O request ratio for the plurality of queues. For example, a to-be-dispatched I/O request ratio for a queue A and a queue B is set to 3:2, and then the I/O requests are dispatched based on the ratio.

It can be learned from the foregoing enumerated implementations that in this embodiment of the present disclosure, not each queue needs to have an attribute that identifies a priority or a weight of the queue, provided that a quantity of to-be-dispatched I/O requests can be controlled to ensure that a quantity of to-be-dispatched I/O requests of an important process is greater than a quantity of to-be-dispatched I/O requests of an unimportant process. Other implementations are not enumerated herein.

Therefore, according to the I/O request scheduling method provided in this embodiment of the present disclosure, a plurality of queues of different priorities are set to store I/O requests corresponding to a plurality of process groups of different priorities, and when the I/O requests are dispatched, an I/O request sent by a high-priority process group is purposefully first dispatched based on the priorities of the queues. A process in the high-priority process group corresponds to a critical application. This ensures that an I/O device can preferably execute an I/O request of the critical application, thereby avoiding congestion of a large quantity of I/O requests of a non-critical application to some extent, and ensuring an I/O request response speed of the critical application.

Based on any one of the first aspect or the foregoing implementations, in some implementations, the I/O request scheduling method further includes obtaining configuration information, where the configuration information includes information indicating a characteristic of a process group, and configuring priorities of the plurality of queues based on the configuration information, where a priority of a queue matches a characteristic of a process group corresponding to the queue. Further, the method further includes obtaining a corresponding quantity of I/O requests from each queue based on a priority of each queue, and dispatching the obtained I/O requests to a lower-layer scheduler or a driver device.

In some implementations, the configuration information includes importance information of a process group, and a priority of a queue corresponding to a high-importance process group is higher than a priority of a queue corresponding to a low-importance process group. Further, the importance information may include information about impact of one or more processes included in the process group on user experience, and a process group having great impact on user experience is more important than a process group having little impact on user experience.

The configuration information may be entered by a user, or obtained through user input. The configuration information may be preset in a system, such that the configuration information is read from a memory or another type of storage. Even if the configuration information is preset, the configuration information may change with a current status of the system. In this case, the weight of each queue or the to-be-dispatched I/O request ratio for the queues can be adjusted in a timely manner such that I/O request dispatching and processing better fit the current status of the system to improve system resource use efficiency and user experience.

Based on any one of the first aspect or the foregoing implementations, in some implementations, the I/O request scheduling method further includes determining an I/O request response speed of one or more of the plurality of queues, and adjusting a size of another queue based on the I/O request response speed. A size of a queue (also referred to as a depth of a queue) represents a total quantity of I/O requests that can be stored in the queue.

In some implementations, the method further includes determining an I/O request response speed of a highest-priority queue, and decreasing a size of one or more queues in other queues if it is determined that the I/O request response speed is less than or equal to a first threshold. Herein, the highest-priority queue may be preset in a queue with an I/O request response speed that may be monitored is preset in the system.

I/O request response speeds of some of the plurality of queues affect sizes of other queues, and in turn, adjusting the sizes of the other queues may affect the I/O request response speeds of the queues. In this way, the I/O request response speed can be further adjusted. In an embodiment, when an I/O request response speed of a critical queue (which is a critical process group) is monitored, the I/O request response speed of the critical queue can be further ensured, thereby effectively avoiding a critical application freeze and improving user experience.

In an embodiment, the first threshold is a preset speed threshold, and may be obtained through testing. For example, the speed threshold may be set to a minimum value of the I/O request response speed that does not affect user experience or has little impact on user experience.

In other implementations, the method further includes determining an I/O request response speed of a highest-priority queue, and increasing a size of one or more queues in other queues if it is determined that the I/O request response speed is greater than a second threshold. Implementation is similar to the foregoing implementations, and details are not described herein again.

An objective of this implementation is to avoid an excessively high I/O request response speed of the critical application, and to balance allocation of I/O resources between the critical application and the non-critical application.

Alternatively, an I/O request response time of a highest-priority queue, not the I/O request response speed, may be determined in the foregoing implementations. In this implementation, the threshold may be accordingly set to a time threshold.

In some implementations, the method further includes determining a quantity of I/O requests stored in a highest-priority queue, and increasing a size of one or more queues in other queues if it is determined that the quantity is less than or equal to a third threshold. The third threshold is an integer greater than or equal to 0, but may be set to a relatively small value, such as 5.

Further, on a basis of this implementation, a condition may be added as follows. The sizes of the other queues are adjusted if it is determined that the quantity is less than or equal to the third threshold for a period of time. This implementation is based on the following consideration, that even the critical application may have no I/O request or a few I/O requests within a period of time, and use relatively few I/O resources. I/O resources cannot be fully utilized. In this case, I/O requests of the other non-critical applications can be dispatched and processed faster by increasing sizes of other non-critical queues, thereby improving I/O resource utilization.

Any one or more of the first threshold, the second threshold, and the third threshold may be set in the system, or any one or more of the foregoing implementations may be implemented.

It should be noted that when both the I/O request response speed (or time) of the highest-priority queue and the quantity of I/O requests stored in the highest-priority queue are monitored in the system, the two types of monitoring may be alternated to avoid a result conflict. When a conflict occurs because the two types of monitoring are not alternated, one result may be randomly selected or may be selected based on a current system status, and the sizes of the other queues are adjusted based on the result.

In the foregoing several implementations, an I/O request response speed of a non-highest-priority queue or a quantity of I/O requests in a non-highest-priority queue may be alternatively determined, and a threshold is also adaptively adjusted. Then, the sizes of the other queues are adjusted based on a current requirement. In addition, a queue with an I/O request response speed may be preset or may be entered by the user.

According to a second aspect, an embodiment of the present disclosure further provides an I/O request scheduling apparatus, including one or more modules that may implement any one of the first aspect or the implementations of the first aspect. When the I/O request scheduling apparatus includes a plurality of modules, one module may implement one or more steps in the first aspect.

According to a third aspect, an embodiment of the present disclosure further provides a computer device such as a terminal device. The computer device includes a processor and a storage. The storage is configured to store a software program, and the processor is configured to read the software program stored in the storage to implement the method according to any one of the first aspect or the implementations of the first aspect. In addition, when the I/O request scheduling apparatus provided in the second aspect is implemented by software, the I/O request scheduling apparatus is stored in the storage in a form of a software program. The processor reads the software program to implement a function of the I/O request scheduling apparatus. The processor may be a single-core processor or a multi-core processor, and the computer device may include one or more processors. The processor may be a central processing unit (CPU), a graphics processing unit (GPU), or another type of processor. A plurality of processors of a same type or a plurality of processors of different types may cooperate to implement the method provided in the embodiments of the present disclosure.

According to a fourth aspect, an embodiment of the present disclosure further provides a computer storage medium. The computer storage medium may be a non-volatile computer storage medium, such that content in the computer storage medium is not lost upon a power failure. The storage medium is configured to store a software program, and the software program can be read by one or more processors such that the one or more processors implement the method according to any one of the foregoing aspects or the implementations.

In conclusion, according to the I/O request scheduling method provided in the embodiments of the present disclosure, a plurality of queues of different priorities are set to store I/O requests corresponding to a plurality of process groups of different priorities, and when the I/O requests are dispatched, an I/O request sent by a high-priority process group is purposefully first dispatched based on the priorities of the queues. A process in the high-priority process group corresponds to a critical application. This ensures that an I/O device can preferably execute an I/O request of the critical application, thereby avoiding congestion of a large quantity of I/O requests of a non-critical application to some extent, and ensuring an I/O request response speed of the critical application.

Further, if the critical application is an application having great impact on user experience, because the I/O request of the application has been processed in a timely manner, execution smoothness of the application also improves, thereby improving user experience.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An I/O request scheduling method provided in the embodiments of the present disclosure is mainly applied to a terminal device. The terminal device may also be referred to as user equipment (UE), a mobile station (MS), a mobile terminal, or the like. Optionally, the terminal may be capable of communicating with one or more core networks through a radio access network (RAN). For example, the terminal may be a mobile phone (also referred to as a "cellular" telephone), or a computer with a mobile feature. For example, the terminal may be a portable, pocket-sized, handheld, computer built-in or in-vehicle mobile apparatus. It should be understood that in addition to the terminal device, the I/O request scheduling method provided in the embodiments of the present disclosure can also be applied to another type of computer device such as a server.

Figure 1:
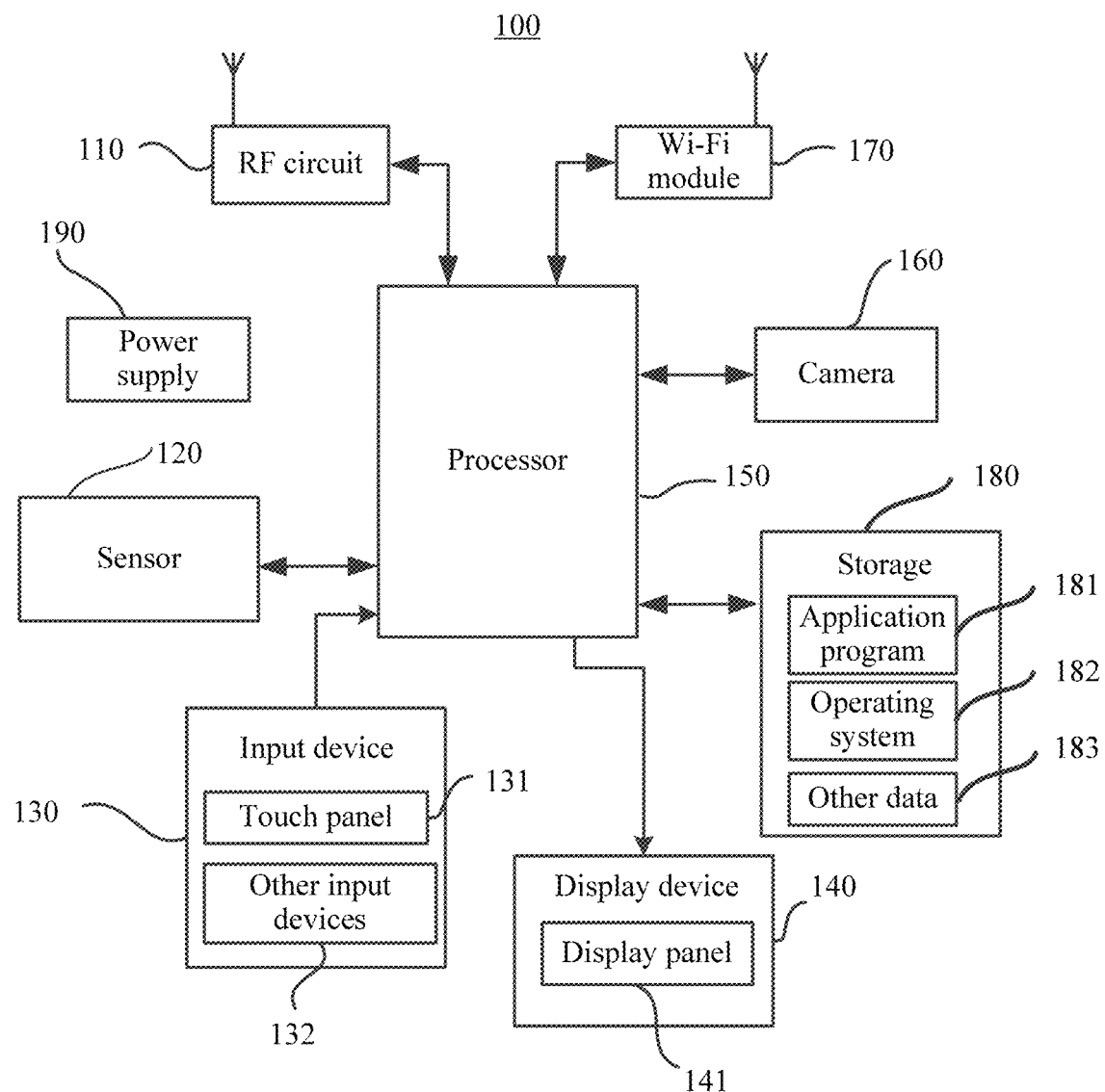
FIG. 1 is a schematic structural diagram of a terminal device according to an embodiment of the present disclosure.

Referring to FIG. 1, shown is a schematic structural diagram of a terminal device according to an embodiment of the present disclosure. As shown in FIG. 1, the terminal device 100 includes a storage 180, a processor 150, and a display device 140.

The storage 180 includes a memory and an external storage. The memory includes a random access memory (RAM), a read-only memory (ROM), a cache, and the like. The external storage includes a disk, an embedded multimedia card (eMMC), a non-volatile memory (NVM), and the like. The storage 180 is configured to store a computer program, and the computer program includes an operating system program 182, an application program 181, and the like. The computer program is stored in the external storage, and the processor 150 loads the computer program from the external storage into the memory before running the computer program. An I/O request mentioned in this embodiment of the present disclosure is a read request or a write request that is sent to the external storage.

The processor 150 may include one or more processors. For example, the processor 150 may include one or more central processing units (CPUs), or include a CPU and a graphics processing unit (GPU). When the processor 150 includes a plurality of processors, the plurality of processors may be integrated on one chip, or may be separate chips. One processor may include one or more processing cores. The processor 150 is configured to read a computer program in the storage 180, and then execute a method defined by the computer program. For example, the processor 150 reads the operating system program 182 to run an operating system (refer to FIG. 2) on the terminal device 100 and implement various functions of the operating system, or reads one or more application programs 181 to run one or more applications on the terminal device.

The operating system program 182 includes a computer program that can implement the I/O request scheduling method provided in the embodiments of the present disclosure. In this way, after the processor 150 reads the operating system program 182 and runs the operating system, the terminal device 100 can have an I/O request scheduling function provided in the embodiments of the present disclosure. This function ensures an I/O response speed for a critical application running on the terminal device 100 to some extent, thereby improving operation experience of a user who uses the terminal device 100.

The display device 140 includes a display panel 141 configured to display information entered by a user or information provided for a user, various menu interfaces of the terminal device 100, and the like. In this embodiment of the present disclosure, the display panel 141 may be configured to display an application such that a user operation on the application is received and an I/O request is generated. Optionally, the display panel 141 may be configured in a form of a Liquid Crystal Display (LCD), an Organic Light-Emitting Diode (OLED), or the like.

As shown in FIG. 1, the terminal device 100 further includes an input device 130 configured to receive entered digital information or character information, or a touch operation or a contactless gesture, and generate signal input and the like related to user setting and function control of the terminal device 100. In an embodiment, the input device 130 may include a touch panel 131. The touch panel 131, also referred to as a touchscreen, may collect a touch operation performed by a user on or in the vicinity of the touch panel 131 (for example, an operation performed on the touch panel 131 or in the vicinity of the touch panel 131 by the user using a finger, a stylus, or any suitable object or accessory), and drive a corresponding connection apparatus according to a preset program. Optionally, the touch panel 131 may include two parts, a touch detection apparatus and a touch controller. The touch detection apparatus detects a touch location of a user, detects a signal brought by a touch operation, and transmits the signal to the touch controller. The touch controller receives touch information from the touch detection apparatus, converts the touch information into touch point coordinates, and sends the touch point coordinates to the processor 150, and can receive a command sent by the processor 150 and execute the command. For example, the user taps an application icon of a camera application on the touch panel 131 using a finger, the touch detection apparatus detects a signal brought by the tap, and then transmits the signal to the touch controller, the touch controller converts the signal into coordinates and sends the coordinates to the processor 150, and the processor 150 performs, based on the coordinates and a type of the signal (tap), an operation of starting the camera application.

The touch panel 131 may be implemented in various types such as a resistive type, a capacitive type, an infrared type, and a surface acoustic wave type. Among current mainstream terminal devices, the touch panel 131 is overlaid on the display panel 141 to form a touch display screen. In addition to the touch panel 131, the input device 130 may further include other input devices 132. The other input devices 132 may include but is not limited to one or more of a physical keyboard, a function key (such as a volume control key or an on/off key), a trackball, a mouse, a joystick, and the like.

In addition to the foregoing modules, the terminal device 100 may further include a power supply 190 configured to supply power to other modules, and a camera 160 configured to take a photo or a video. The terminal device 100 may further include one or more sensors 120 such as an acceleration sensor and a light sensor. The terminal device 100 may further include a radio frequency (RF) circuit 110 configured to perform network communication with a wireless network device, and may further include a Wireless Fidelity (Wi-Fi) module 170 configured to perform Wi-Fi-based communication with another device.

I/O scheduling of the terminal device is implemented in an operating system (which is the operating system program 182). The embodiments of the present disclosure propose an improvement on an existing I/O scheduling method in the operating system. It should be noted that, when the method proposed in the embodiments of the present disclosure is implemented using software in conjunction with hardware, the software is stored in the storage 180, and the processor 150 implements the method provided in the embodiments of the present disclosure by reading the software stored in the storage 180. Other devices different from the processor 150 and the storage 180 in FIG. 1 are optional for the embodiments of the present disclosure.

Figure 2:
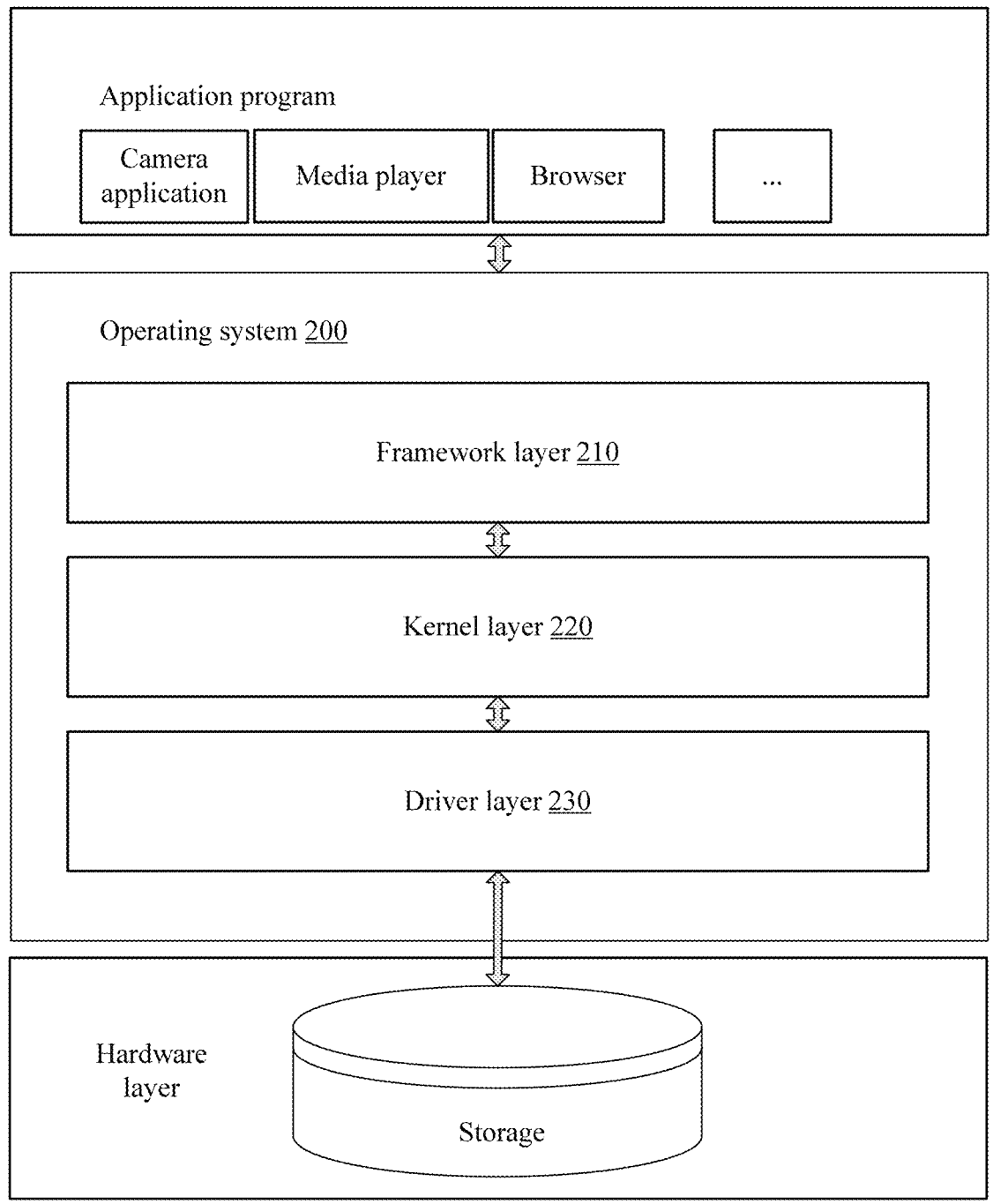
FIG. 2 is a schematic diagram of a logical structure of an operating system according to an embodiment of the present disclosure.

Referring to FIG. 2, shown is a schematic diagram of a logical structure of an operating system to which an I/O scheduling method is applied. An ANDROID operating system is used as an example in an embodiment of the present disclosure shown in FIG. 2. FIG. 2 may also be considered as a schematic diagram of a logical structure of a terminal device after the operating system program 182 and the application program 181 in FIG. 1 run on the terminal device.

As shown in FIG. 2, an operating system 200 includes a framework layer 210, a kernel library layer (referred to as a kernel layer) 220, and a driver layer 230. A plurality of application programs such as a camera application, a media player, and a browser run on the operating system 200 simultaneously. When these application programs are running, a process or thread of the application programs generates an I/O request at the operating system 200 layer, and the I/O request is eventually dispatched to a storage at a hardware layer. For example, to implement an action of storing a photo into the storage for the camera application, a process of the camera application enters the kernel layer from an application layer through a system call. Then, the process creates an I/O write request at the kernel layer. The I/O write request is used to request the storage to store the currently taken photo to a specific location. In another case, the application may create an I/O read request for reading data stored in the storage, for example, opening a stored photo. In addition to the storage, the hardware layer further includes another type of hardware such as a processor, an input device, or a display device (as shown by FIG. 1).

Figure 3:
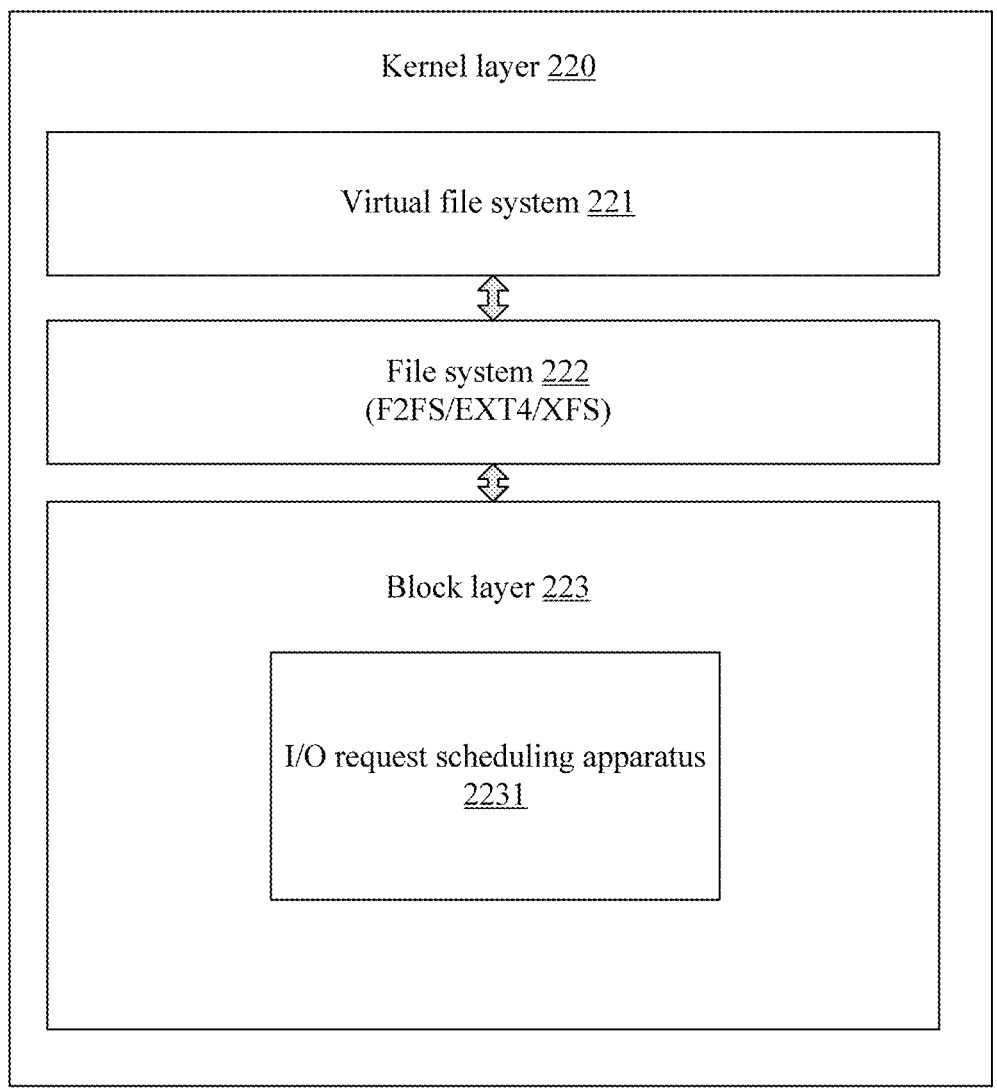
FIG. 3 is a schematic diagram of a further logical structure of the operating system provided in FIG. 2.

In an embodiment, as shown in FIG. 3, the kernel layer 220 includes a virtual file system (VFS) layer 221, a file system layer 222, and a block device layer (block layer) 223. Mainstream file systems include Flash Friendly File System (F2FS), Fourth Extended File System (EXT4), a log file system (for example, Extended File System (XFS)), and the like. The driver layer 230 may include a disk driver, an eMMC driver, a NVM driver, a CPU driver, and the like, for driving respective hardware.

With reference to FIG. 2 and FIG. 3, a process of an application generates an I/O request at the file system layer 222, and then the process submits the I/O request to the block layer 223. In this case, depending on implementation of the block layer, the process probably submits the request to the driver layer 230 by itself (or the process probably delivers the request to a kernel thread for submission). Then, the process encapsulates the request into a command that can be executed by the storage, sends the command to the storage, and then returns and waits for I/O request execution to end. The command submitted to the storage is obtained and processed by a controller of the storage. After the processing is completed, the storage sends an electrical signal (an interrupt signal) to the CPU. After receiving the signal, the CPU executes an interrupt handler to wake up the process. After being woken up, the process copies data to a buffer of the process, then exits the kernel layer, and returns to the application layer.

It should be understood that although a software method is mainly executed by a process or a thread (not limited to a process or a thread of an application), for ease of reading, a description like "a layer receives or dispatches an I/O request" is used in this application. A person of ordinary skill in the art should understand that the description means that a process or a thread receives or dispatches the I/O request at the layer.

Traditionally, the block layer 223 stores I/O requests of all applications in a single queue. For example, the I/O requests of all the applications are stored in one queue. Then, these I/O requests are sent to corresponding drivers serially (or may be sent to a scheduling layer, and then sent to the drivers using the scheduling layer). In this case, when some non-critical applications always generate a large quantity of I/O requests, the large quantity of I/O request of the non-critical applications exist in this queue for a long time. As a result, an I/O request dispatching speed of a critical application is excessively low, causing the critical application to freeze and affecting user experience of the terminal device.

As shown in FIG. 3, in this embodiment of the present disclosure, a group-based I/O request management function is provided at the block layer 223. In an embodiment, an I/O request scheduling apparatus 2231 in this embodiment provides an I/O request scheduling method to perform group-based scheduling on I/O requests. It should be noted that the apparatus 2231 may be an improved apparatus based on an original I/O scheduling apparatus (or module) in other embodiments, or may be an apparatus added to a scheduling apparatus provided in other embodiments. In specific implementation, the I/O request scheduling apparatus 2231 may be implemented as one module, or may be implemented as a plurality of modules that cooperate with each other.

Based on a characteristic of an application, such as importance of the application to the system or impact of the application on user experience, a plurality of applications in the terminal device are classified into at least a critical application and a non-critical application. For example, an application of high importance to the system or of great impact on user experience is classified as a critical application, and the others are classified as non-critical applications. Correspondingly, the I/O request scheduling apparatus 2231 includes at least two queues a critical queue and a non-critical queue. The critical queue and the non-critical queue store an I/O request of a critical application (referred to as a critical I/O request) and an I/O request of a non-critical application (referred to as a non-critical I/O request), respectively. The I/O request scheduling apparatus 2231 schedules, based on importance of applications corresponding to the queues, the I/O requests stored in the queues to control dispatching of the I/O requests. For example, because the critical queue is more important than the non-critical queue, a ratio of I/O requests of the critical queue to I/O requests of the non-critical queue in dispatched I/O requests is set to A:B (it can be considered as setting I/O dispatching bandwidth of the two), where A is greater than B, and A and B can be considered as weights of the critical queue and the non-critical queue. Then, the I/O requests are dispatched based on this ratio.

Even if the I/O requests are dispatched based on the specified ratio, in some cases, excessive I/O requests of a non-critical application may be still probably dispatched to the storage, and therefore block the storage. For example, during a period of time, a critical application does not generate an I/O request corresponding to the critical application, but a non-critical application generates a lot of I/O requests, and these I/O requests are stored to the non-critical queue. In this case, even if these I/O requests are dispatched based on the specified ratio, because there is no I/O request in the critical queue, each time I/O requests are dispatched, the I/O request scheduling apparatus 2231 can only obtain an I/O request from the non-critical queue and dispatch the I/O request to the storage. After this period of time, the storage is full of to-be-processed non-critical I/O requests. As a result, an I/O request of the critical application is forced to wait for a long time, resulting in an excessively low response speed for the I/O request of the critical application.

Considering the foregoing illustrated case or other possible cases, the I/O request scheduling apparatus 2231 may further monitor an I/O request response speed of the critical queue. If it is determined that the I/O request response speed of the critical queue is excessively low, a queue depth of at least one non-critical queue is reduced to decrease a quantity of I/O requests stored in the non-critical queue.

In an embodiment, if detecting that the I/O request response speed of the critical queue is excessively low, the I/O request scheduling apparatus 2231 determines that the foregoing case may occur. In this case, the queue depth of the non-critical queue is reduced to block some I/O requests of non-critical applications at the block layer in a timely manner, such that the I/O requests of the non-critical applications enter a sleeping/waiting state. Because it takes time to restart from the sleeping/waiting state, a movement speed of the I/O requests of the non-critical applications from the block layer to the non-critical queue decreases. When the non-critical queue is empty, the I/O requests of the non-critical applications probably have not arrived yet such that the to-be-processed non-critical I/O requests in the storage are gradually reduced, a possibility of processing the critical I/O request by the storage is increased, and the I/O request response speed of the critical application is increased.

Further, if it is determined that there is no I/O request in the critical queue or the I/O request response speed of the critical queue is greater than a preset value, the depth of the non-critical queue may be gradually increased. The "gradual" increase may be implemented as increasing the depth by a fixed value or by a specific multiple each time the foregoing condition is met. For example, when it is determined for the first time that the I/O request response speed of the critical queue is greater than the preset value, a depth of at least one non-critical queue is increased by 5 (five more I/O requests can be stored). The I/O request response speed of the critical queue is detected again after a period of time. If the I/O request response speed is still greater than the preset value, the depth of the non-critical queue is further increased by 5. In an embodiment, another non-critical queue that has not been increased in depth last time may be increased in depth this time. The preset value may be fixed or may be reset based on a current system status. Various specific implementations may be used, and details are not described herein. Such a technical solution can increase the I/O request response speed of the non-critical application to some extent when the critical application requires relatively few I/O resources, thereby ensuring overall I/O request scheduling efficiency of a system.

It should be noted that a method for monitoring an I/O request response speed and adjusting a queue depth in a timely manner according to this embodiment of the present disclosure may be used independently. This method does not rely on a method for setting an I/O dispatching ratio based on a weight.

In addition, to further increase the I/O request response speed of the critical application, the I/O request scheduling apparatus 2231 may add a flag to an I/O request of the critical application (which is an I/O request stored in the critical queue) when dispatching the I/O request. This flag is used to indicate that the I/O request is an I/O request of a critical application such that a driver device (or a scheduler) at the driver layer 230 (FIG. 2) that receives the I/O request can identify, based on this flag, that the I/O request is an I/O request of a critical application, and preferably submit the I/O request of the critical application to a next device. The next device is the storage (FIG. 2). However, in another implementation, a kernel layer further includes a scheduling layer or a scheduler. In this case, the I/O request scheduling apparatus 2231 dispatches the I/O request to the scheduler, and the scheduler performs further scheduling on the I/O request, for example, identifying that the I/O request is an I/O request of a critical application, and sending the I/O request to the driver device at the driver layer such that the driver device submits the I/O request to the storage.

It should be noted that, in specific implementation of the solution, a quantity of application groups, a quantity of queues, and how to group a plurality of applications may be set based on a terminal device status or a user requirement. This is not limited in this embodiment of the present disclosure. In addition, application grouping is implemented at the framework layer 210 (FIG. 2), and a grouping result is provided for a block layer of a kernel for use. A group of an application may change. For example, an application originally runs on the background and belongs to a noncritical application group. When a switch-to-foreground event of the application is detected, it indicates that the application is to switch to run on the foreground. In this case, the application is reclassified to a critical application group.

The following describes an implementation procedure of the I/O request scheduling method provided in the present disclosure through a more specific embodiment. It should be noted that mutual reference may be made to the schematic diagrams of the logical structures related to the operating system in the embodiments of the present disclosure, and some duplicate information has been omitted to avoid repetition.

Figure 4:
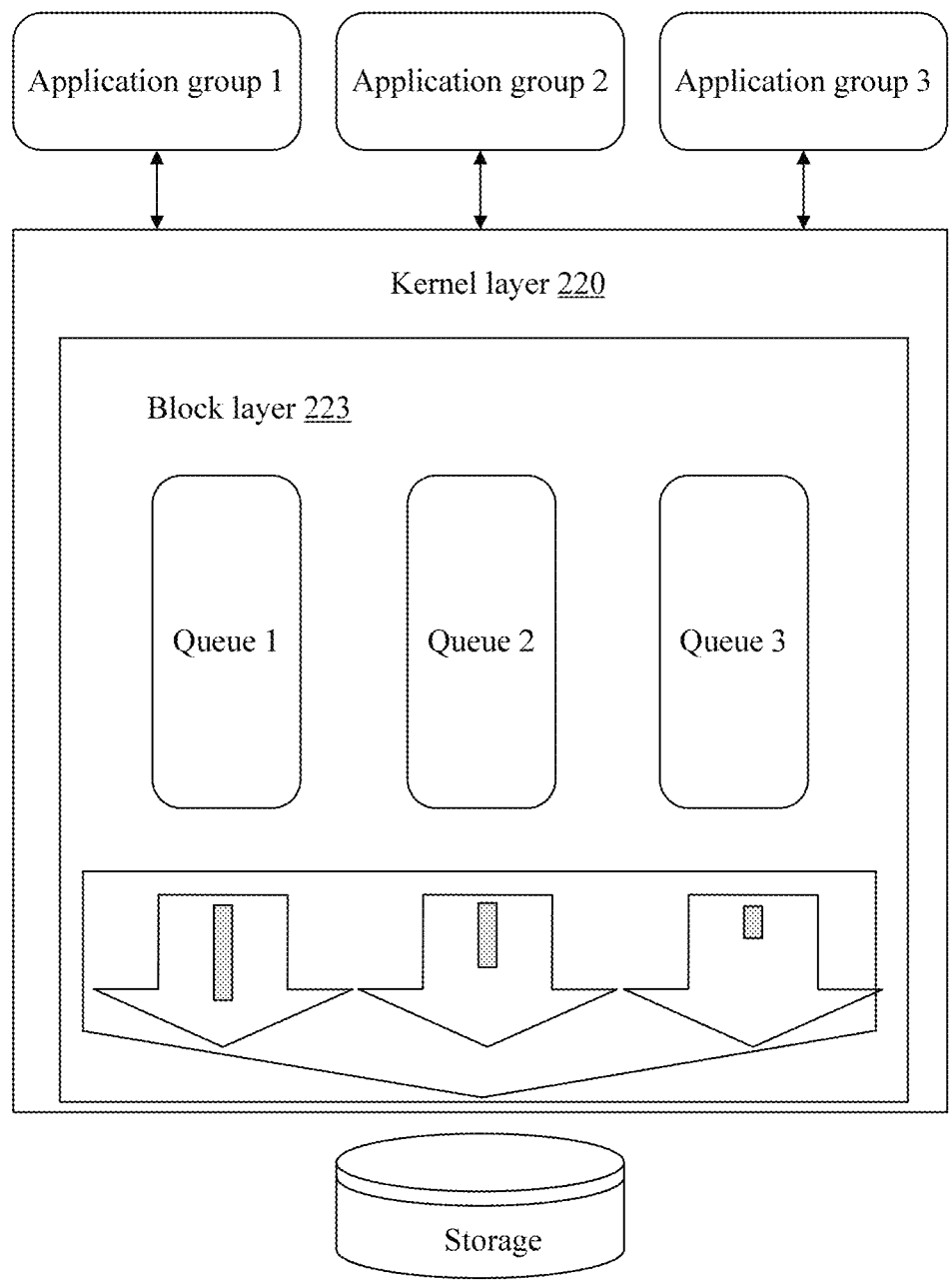
FIG. 4 is a schematic diagram of a principle of an I/O request scheduling method according to an embodiment of the present disclosure.

Referring to FIG. 4, shown is a schematic implementation diagram of an I/O request scheduling method according to an embodiment of the present disclosure. This method is implemented by the I/O request scheduling apparatus 2231. In other implementations, this method may be implemented by another module of an operating system.

As shown in FIG. 4, in this embodiment of the present disclosure, applications are classified into three groups based on impact on user experience. Group 1 includes an application running on the foreground (hereinafter referred to as a foreground application), a system service, and a user-experience-sensitive application (such as a music player application) among applications running on the background (hereinafter referred to as a background application). Group 2 includes a user-experience-insensitive background application. Group 3 includes a user-unaware background application.

In other embodiments, user-experience-sensitive applications and user-experience-insensitive applications can be further classified based on sensitivity, and based on this consideration, applications can be classified into more than three groups. In other embodiments, the applications may be classified into only two groups, a foreground application and a background application, or the applications are classified into two groups, the applications in group 1 and the applications in group 2 and group 3.

It should be noted that although group 1, group 2, and group 3 are obtained through classification based on impact of the applications on user experience because one application may have a plurality of processes, the three groups actually include processes of the applications included in the groups. Therefore, the three groups may also be referred to as process groups. In other embodiments, different processes of one application may be classified into different process groups. In this implementation, the name "process group" is more appropriate than the name "application group".

Figure 5A:
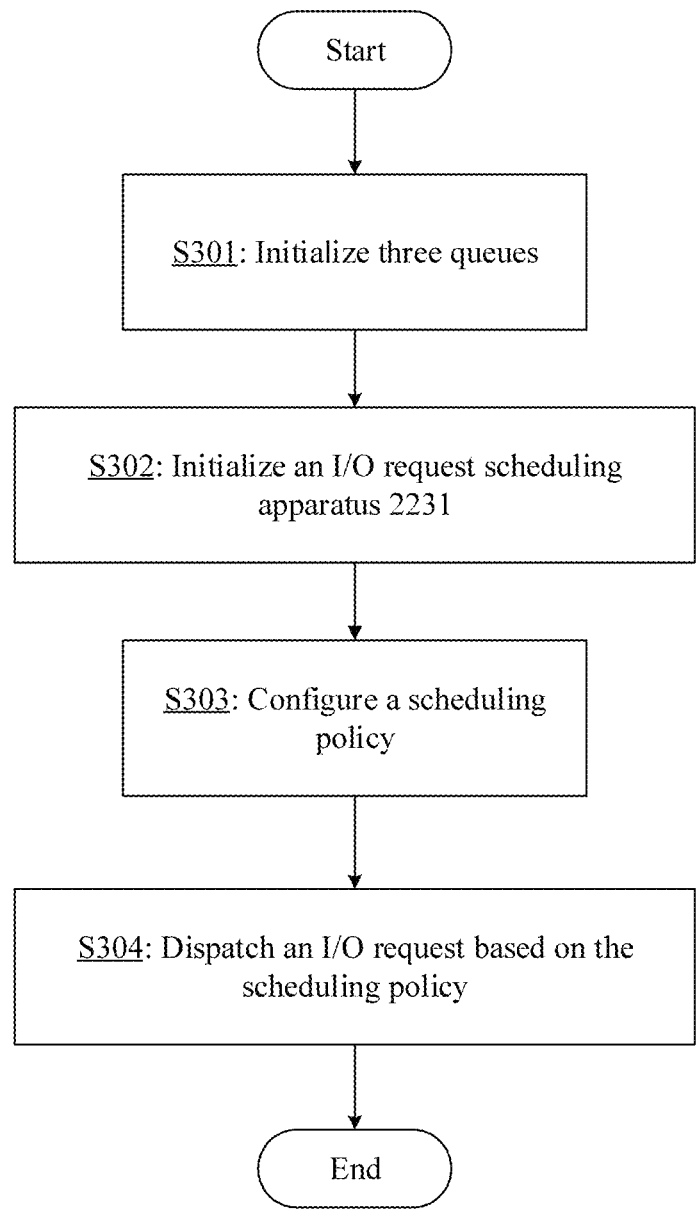
FIG. 5A is a schematic flowchart of an I/O request scheduling method according to an embodiment of the present disclosure.

Referring to FIG. 5A, when an ANDROID system is initialized, a kernel generates, based on the foregoing three groups, three queues corresponding to the three groups, queue 1, queue 2, and queue 3 (S301). These three queues are used to store I/O requests of applications in group 1, group 2, and group 3, respectively. Then, the kernel initializes the I/O request scheduling apparatus 2231 (S302), and the I/O request scheduling apparatus 2231 reads a configuration parameter to complete configuration of a scheduling policy (S303).

The configuration parameter may include weights of the three queues or a to-be-dispatched I/O requests ratio for the three queues, a queue depth value for each increase or decrease, and an I/O response time threshold corresponding to queue 1 (or another critical queue). The configuration parameters may be entered by a user temporarily or may be preset in the system. If there are a plurality of configuration parameters, these configuration parameters may be obtained at the same time, or may be obtained one by one based on a requirement. After configuration of the scheduling policy is completed, the I/O request scheduling apparatus 2231 dispatches the I/O requests based on the scheduling policy (S304).

For example, the to-be-dispatched I/O request ratio for queue 1, queue 2, and queue 3 is 3:2:1, an initial depth of each queue is 32, a depth value for each decrease or increase is ½ of a current depth value of the queue, and a response time threshold corresponding to queue 1 is at a millisecond level. As shown in FIG. 4, it is assumed that the I/O request scheduling apparatus 2231 can simultaneously send M I/O requests (M is determined by a processing capability of the storage). One process (or thread) obtains $M*½$, $M*⅓$, and $M*⅙$ I/O requests from queue 1, queue 2, and queue 3, respectively, and then the thread dispatches the obtained M I/O requests to a scheduler or a driver device at a lower layer. If the obtained M I/O requests are dispatched to the scheduler, the scheduler may further set or change an order of the M I/O requests based on a specific scheduling policy, and then dispatches the M I/O requests to the driver device. An existing scheduler may be used, and details are not described herein.

For another example, when the configuration parameter includes the weights of the three queues, the weights of the three queues are sorted based on importance of the queues, a weight of queue 1>a weight of queue 2>a weight of queue 3. During I/O request dispatching, a quantity of I/O requests that should be obtained from each queue is calculated with reference to the weight value of each queue, and then the I/O requests are dispatched.

In this embodiment of the present disclosure, the weights of the three queues are different, such that priorities of the three queues are different. However, in other implementations, when there are three or more queues, two or more of the queues are allowed to have a same priority. In addition, in this embodiment of the present disclosure or in other embodiments, both a depth and a priority of a queue may change. Originally different depths or priorities of queues may become the same, or an originally same depth or priority of queues may become different.

A quantity of I/O requests processed by the storage in unit time is an inherent attribute of the storage, and storages in a terminal device are fixed. Therefore, a quantity of I/O requests processed in unit time (also referred to as I/O bandwidth) is fixed. A quantity of I/O requests dispatched in unit time is also fixed. Therefore, increasing a proportion of dispatched I/O requests of an important application means increasing a quantity of I/O requests of the important application in the I/O requests dispatched in unit time, or increasing a quantity of I/O requests of the important application that are processed in unit time such that processing efficiency of the I/O requests of the important application is improved, and a problem that the important application freezes can be mitigated to some extent.

Figure 5B:
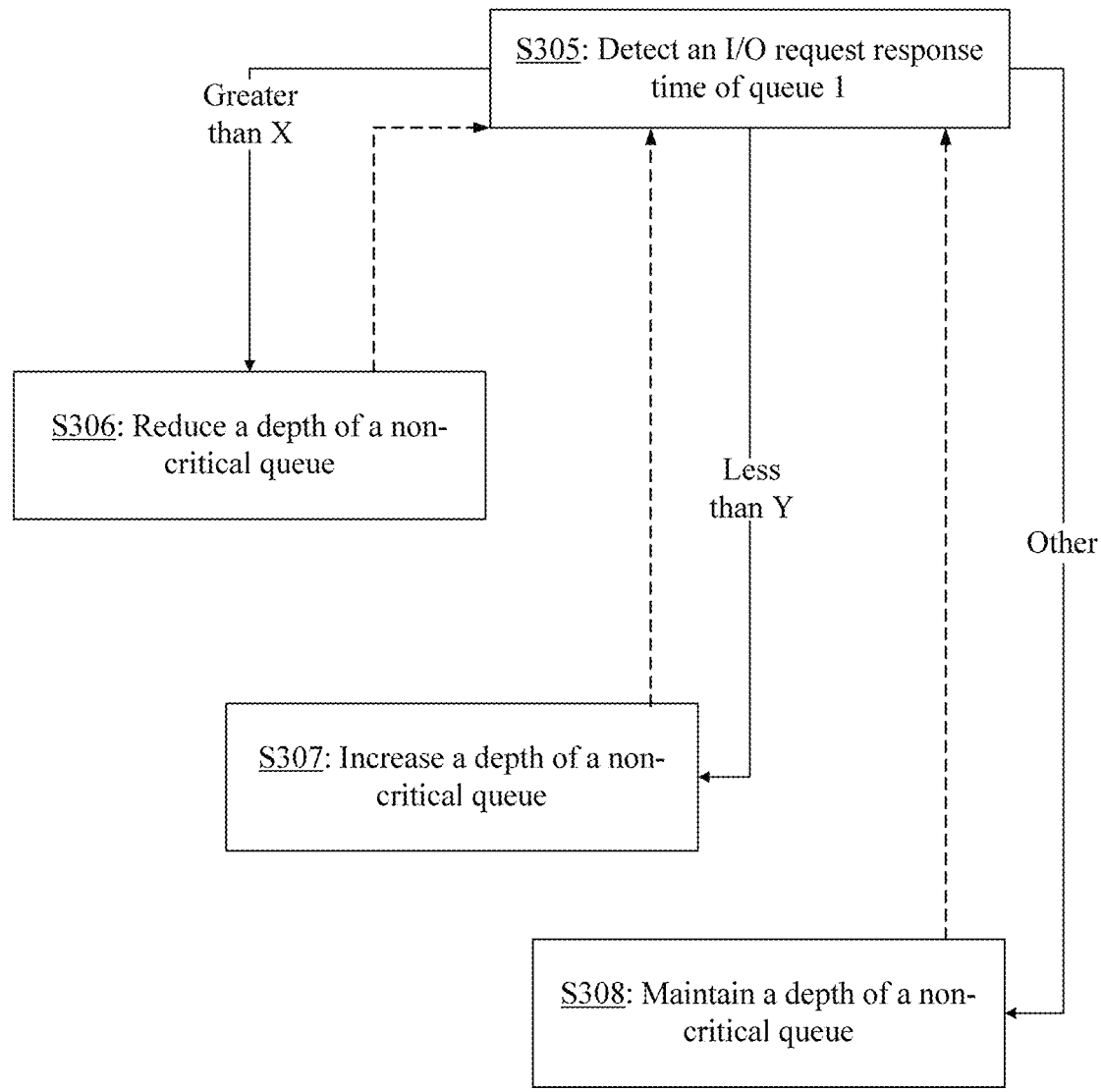
FIG. 5B is a schematic flowchart of another I/O request scheduling method according to an embodiment of the present disclosure.

Further, as shown in FIG. 5B, during I/O request dispatching, the I/O request scheduling apparatus 2231 also detects an I/O request response time of queue 1 (because queue 1 is a critical queue) (S305). This detection may be event-triggered or periodic. The "event" may be an event triggered when a user discovers a freeze problem and actively reports the freeze problem, or may be an event triggered by the system after the system automatically detects that an important application freezes, or the like. This is not limited in this embodiment of the present disclosure.

In an embodiment, the I/O request response time of queue 1 may be obtained in the following manner. The I/O request scheduling apparatus 2231 obtains a response time of a current I/O request in queue 1 as the I/O request response time of queue 1, or records a response time of each of a plurality of I/O requests within a period of time, calculates an average response time of these I/O requests, and uses the average response time as the I/O request response time of queue 1.

If it is determined that the I/O request response time of queue 1 is greater than a threshold X, a depth of queue 2 is reduced and/or a depth of queue 3 is reduced (S306), and preferably, the depth of queue 3 is reduced, or depths of both queues are reduced but a reduced depth of queue 3 is greater than that of queue 2.

In an embodiment, the "reduced depth" may mean that the depth is directly halved or reduced by a specific value each time. The value may be configured by a user each time the depth should to be reduced, or may be set to a default value. The value may be changed even if the value is set.

If it is determined that the I/O request response time of queue 1 is less than a threshold Y (Y is set to be less than X), the depth of queue 2 is increased and/or the depth of queue 3 is increased (S307), and, the depth of queue 2 is increased, or depths of both queues are increased but an increased depth of queue 2 is greater than that of queue 3.

If it is determined that the I/O request response time of queue 1 is less than or equal to the threshold X and greater than or equal to the threshold Y, the current depth of queue 2 or queue 3 is maintained (S308).

Further, in addition to the foregoing cases, if the I/O request scheduling apparatus 2231 detects that no I/O request exists in queue 1 for a long time or a quantity of I/O requests in queue 1 is less than a specific threshold for a long time (for example, the quantity stays at 2 or less), the depth of queue 2 and/or the depth of queue 3 may be increased once at regular intervals. In an embodiment, how small the quantity is and how long the small quantity lasts may be set based on a current operating status of the terminal device or a user requirement.

Through timely adjustment of the depth of each queue, the I/O request response time of the critical queue is gradually restored such that a response speed of a critical application (which is a foreground application, a system service, or a user-experience-sensitive background application) corresponding to the critical queue is increased, and user experience is improved. When the I/O request response time of the critical queue is quite short (or a response speed is high) or there is no I/O request (or few I/O requests) in the critical queue, a depth of a non-critical queue is gradually increased. This allows other applications to use remaining I/O resources when the critical application does not use many I/O resources to avoid a waste of I/O resources and improve I/O resource utilization of the system.

It should be noted that, in other implementations, a queue may not be in one-to-one correspondence with an application group. In an embodiment, one application group may be corresponding to a plurality of queues.

In specific implementation, a specific process or thread that performs the I/O request scheduling method may be determined based on a specific situation during code compilation. Various implementations may be used, and are not specifically limited in this embodiment of the present disclosure.

The following describes a possible logical structure of the foregoing I/O request scheduling apparatus.

Figure 6:
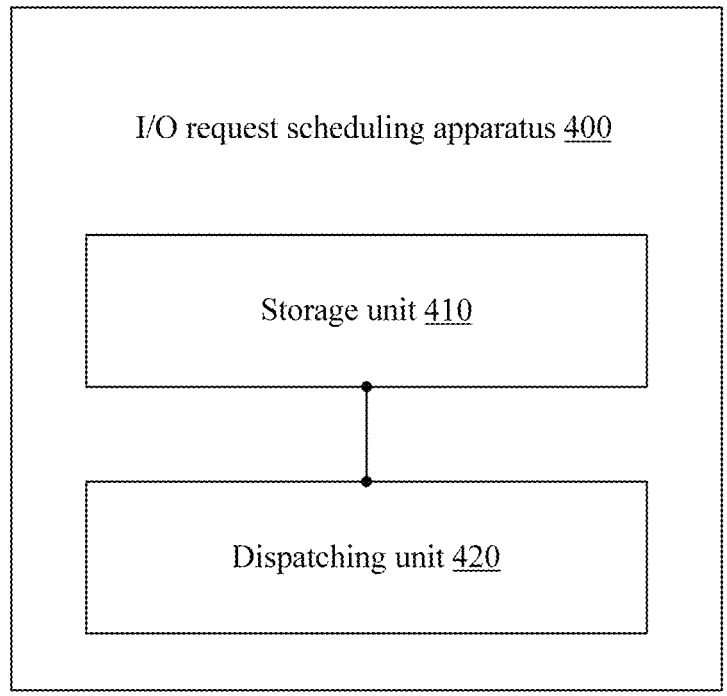
FIG. 6 is a schematic diagram of a logical structure of an I/O request scheduling apparatus according to an embodiment of the present disclosure.

Referring to FIG. 6, shown is a schematic diagram of a logical structure of an I/O request scheduling apparatus according to an embodiment of the present disclosure. The I/O request scheduling apparatus 400 includes a storage unit 410 and a dispatching unit 420. The storage unit 410 is configured to store a plurality of received I/O requests into a plurality of queues. One queue corresponds to at least one process group, each process group includes one or more processes, and each received I/O request is stored into a queue corresponding to a process group to which a process corresponding to the I/O request belongs. The dispatching unit 420 is configured to dispatch the I/O requests in the plurality of queues to an I/O device, where a quantity of I/O requests from a high-priority queue is greater than a quantity of I/O requests from a low-priority queue during one dispatching procedure. Further, a priority of a queue matches a characteristic of a process group corresponding to the queue.

Figure 7:
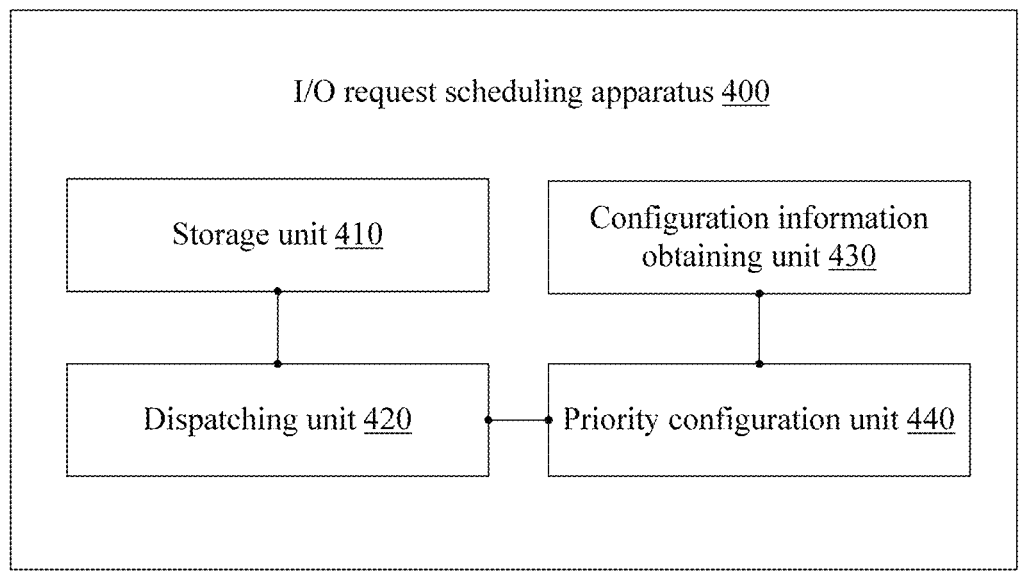
FIG. 7 is a schematic diagram of a logical structure of another I/O request scheduling apparatus according to an embodiment of the present disclosure.

Further, as shown in FIG. 7, the I/O request scheduling apparatus 400 may further include a configuration information obtaining unit 430 and a priority configuration unit 440. The configuration information obtaining unit 430 is configured to obtain configuration information. The configuration information includes information indicating a characteristic of a process group. The priority configuration unit 440 is configured to configure priorities of the plurality of queues based on the configuration information. A priority of a queue matches a characteristic of a process group corresponding to the queue. Further, the dispatching unit 420 obtains a corresponding quantity of I/O requests from each queue based on the priorities of the queues configured by the priority configuration unit 440, and performs a dispatching operation.

The configuration information includes importance information of the process group (which is importance information of an application included in the process group), and higher importance of a process group corresponding to a queue indicates a higher priority of the queue. In an embodiment, the importance information may include information about impact of one or more processes included in the process group on user experience, and greater impact on user experience indicates higher importance of the process group. The impact on user experience is actually how much impact can be perceived by a user if the process or application freezes. For example, a foreground application is considered to be an application that is visible to a user. Therefore, if the foreground application freezes, the user can perceive it by default. The foreground application can be considered as a high-importance application, while a background application is considered as a low-importance application that is invisible to a user. However, there are also some background applications having a user-aware characteristic, for example, making a voice or another action that can be perceived by the user. Applications like a music player application can greatly affect user experience if the application freezes. Therefore, these background applications can also be considered as high-importance applications.

In some implementations, the user may define importance of each application based on the foregoing description, set an application group based on the importance of each application, determine, based on the application group, configuration information of a queue corresponding to the group, and enter the configuration information to configure a priority of the corresponding queue. In this implementation, an operating system can monitor a change in importance of the application or process (for example, a process switches from the foreground to the background) to adjust the application group in a timely manner.

In other implementations, the operating system monitors and collects information of an application or a process, for example, whether the application or the process is on the foreground or background, and whether there is a voice action, determines importance of the application based on the information, implements grouping on the application, determines, based on an application group, configuration information of a queue corresponding to the group, and transfers the configuration information to the I/O request scheduling apparatus provided in this embodiment of the present disclosure. The apparatus configures a priority of the queue based on the configuration information.

Figure 8:
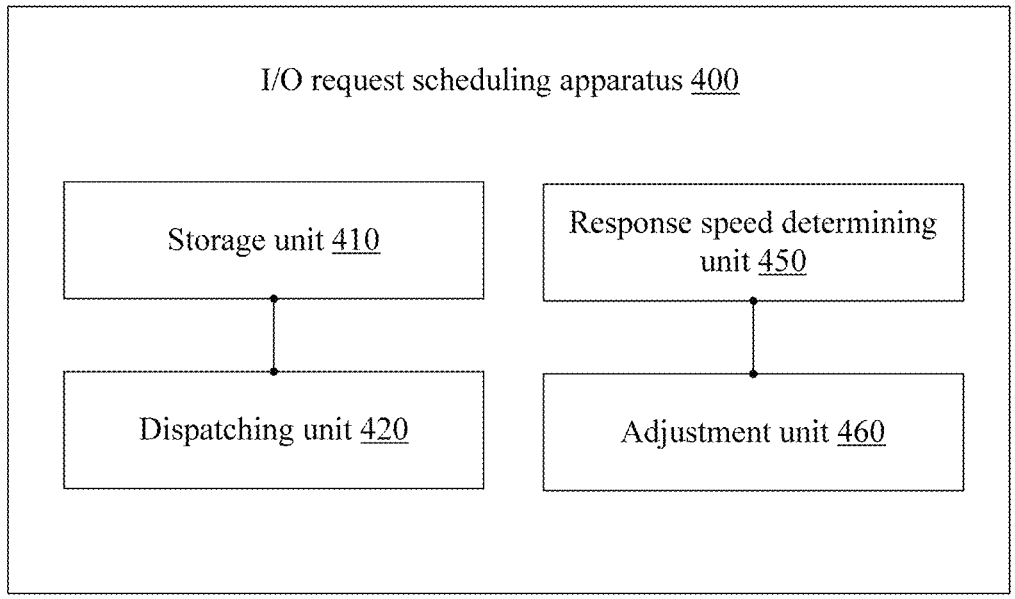
FIG. 8 is a schematic diagram of a logical structure of another I/O request scheduling apparatus according to an embodiment of the present disclosure.
Figure 9:
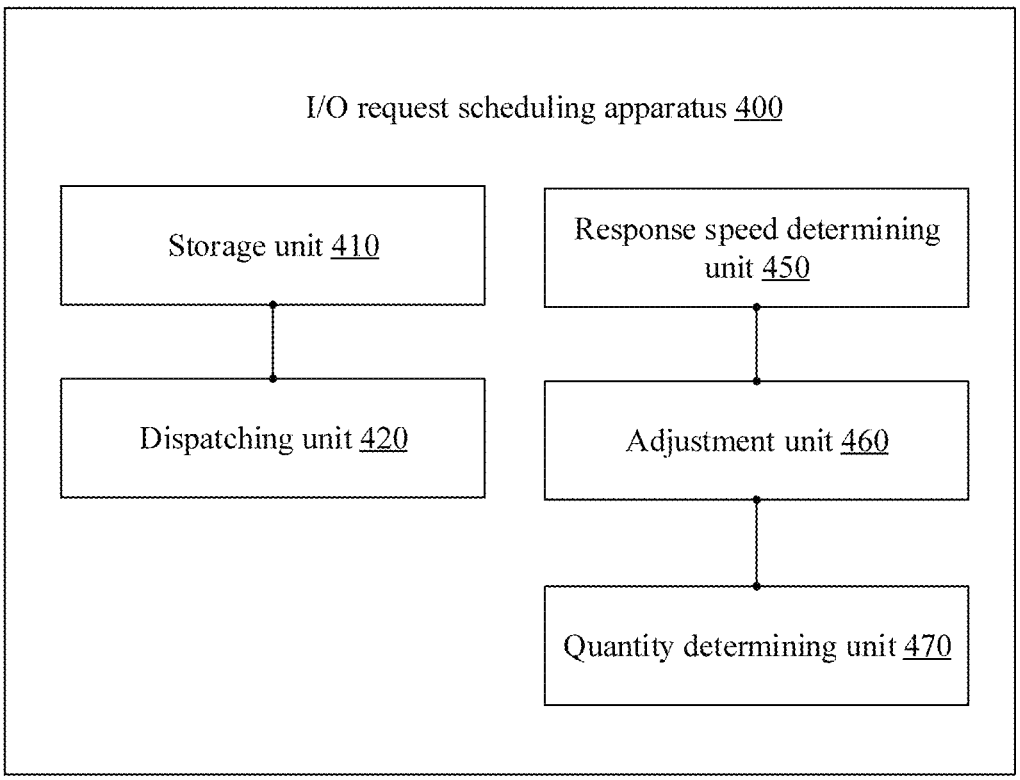
FIG. 9 is a schematic diagram of a logical structure of another I/O request scheduling apparatus according to an embodiment of the present disclosure.

On the basis of the apparatus shown in FIG. 6, as shown in FIG. 8, the I/O request scheduling apparatus 400 may further include a response speed determining unit 450 and an adjustment unit 460. In an embodiment, units 450 and 460 may be added to the apparatus shown in FIG. 7 to obtain another I/O request scheduling apparatus. The response speed determining unit 450 is configured to determine an I/O request response speed of one or more of the plurality of queues. The adjustment unit 460 is configured to adjust a size of another queue based on the I/O request response speed. Generally, the response speed determining unit 450 is configured to determine a response speed of an I/O request in a queue corresponding to a relatively important process group, for example, a response speed of an I/O request in the foregoing highest-priority queue 1. When the I/O response speed is abnormal, a size of another queue or a size of the queue itself is adjusted in a timely manner to change an I/O request response speed of the queue. In an embodiment, if it is determined that the I/O request response speed of the highest-priority queue is less than or equal to a first threshold, a size of one or more queues in other queues is decreased to increase the I/O request response speed, or if it is determined that the I/O request response speed of the highest-priority queue is greater than (or equal to) a second threshold, a size of one or more queues in other queues is increased to increase I/O response speeds of other queues and balance usage of I/O resources. Further, as shown in FIG. 9, the I/O request scheduling apparatus 400 may further include a quantity determining unit 470 configured to determine a quantity of I/O requests stored in a highest-priority queue. If the quantity determining unit 470 determines that the quantity is less than or equal to a third threshold, the adjustment unit 460 is configured to increase a size of one or more queues in other queues. When a quantity of I/O requests of a high-priority application is small or even is 0, that is, when a small quantity of I/O resources are occupied or no I/O resource is occupied, a size of a lower-priority queue is increased such that an I/O request of the lower-priority queue can occupy more I/O resources, thereby increasing I/O resource utilization.

For specific implementation of the solutions in the apparatus embodiments, refer to the foregoing method embodiments. Details are not described herein again.

The described apparatus embodiment is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the apparatus embodiment provided in the present disclosure, connection relationships between the modules indicate that there are communication connections between the modules, and the communication connections may be implemented as one or more communications buses or signal cables.

Based on the foregoing descriptions of the embodiments, a person skilled in the art may clearly understand that the apparatus in the embodiments of the present disclosure may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like.

The foregoing descriptions are merely specific implementations of the present disclosure, but are not intended to limit the protection scope of the present disclosure.

What is claimed is:

1. An input/output (I/O) request scheduling method, comprising:
    storing a plurality of I/O requests into a plurality of queues, wherein a queue of the plurality of queues corresponds to a process group that comprises one or more processes, and wherein an I/O request of the plurality of I/O requests is stored in the queue corresponding to the process group associated with the I/O request;
    dispatching the plurality of I/O requests in the plurality of queues to an I/O device, wherein the plurality of queues comprises a high-priority queue and a low-priority queue, and wherein a quantity of I/O requests dispatched from the high-priority queue is greater than a quantity of I/O requests dispatched from the low-priority queue;
    determining an I/O request response speed of a highest-priority queue of the plurality of queues;
    decreasing a size of another queue different from the highest-priority queue in response to the I/O request response speed of the highest-priority queue being less than or equal to a first threshold; and
    increasing the size of the other queue in response to the I/O request response speed of the highest-priority queue being greater than a second threshold.

2. The method according to claim 1, wherein the queue is associated with a priority based on a characteristic of the process group associated with the queue.

3. The method according to claim 1, further comprising:
    obtaining configuration information comprising information indicating a characteristic of the process group; and
    configuring a priority of each of the plurality of queues based on the configuration information, wherein the priority of each of the plurality of queues is based on the characteristic of the process group associated with each of the plurality of queues.

4. The method according to claim 1, further comprising:
    determining a quantity of I/O requests stored in the highest-priority queue; and
    increasing the size of the other queue in response to the quantity of I/O requests stored in the highest-priority queue being less than or equal to a third threshold.

5. The method according to claim 1, further comprising obtaining configuration information associated with the process group, wherein the configuration information comprises importance information indicating a characteristic of the process group, and wherein a priority of a queue associated with a high-importance process group is higher than a priority of a queue associated with a low-importance process group.

6. The method according to claim 5, wherein the importance information comprises information about an impact of the one or more processes comprised in the process group based on a user experience, and wherein a process group having great impact on the user experience is more important than a process group having little impact on the user experience.

7. A computer device, comprising:
a memory configured to store instructions; and
a processor coupled to the memory and configured to execute the instructions, which cause the processor to be configured to:
  store a plurality of input/output (I/O) requests into a plurality of queues, wherein a queue of the plurality of queues corresponds to a process group that comprises one or more processes, and wherein an I/O request of the plurality of I/O requests is stored in the queue corresponding to the process group associated with the I/O request;
  dispatch the plurality of I/O requests in the plurality of queues to an I/O device, wherein the plurality of queues comprises a high-priority queue and a low-priority queue, and wherein a quantity of I/O requests from the high-priority queue is greater than a quantity of I/O requests from the low-priority queue;
  determine an I/O request response speed of a highest-priority queue of the plurality of queues;
  decrease a size of another queue different from the highest-priority queue in response to the I/O request response speed of the highest-priority queue being less than or equal to a first threshold;
  increasing the size of the other queue in response to the I/O request response speed of the highest-priority queue being greater than a second threshold.

8. The computer device according to claim 7, wherein the instructions, when executed, further cause the processor to be configured to:
  obtain configuration information comprising information indicating a characteristic of the process group; and
  configure a priority of each of the plurality of queues based on the configuration information, wherein the priority of each of the plurality of queues is based on the characteristic of the process group associated with each of the plurality of queues.

9. The computer device according to claim 7, wherein the instructions, when executed, further cause the processor to be configured to obtain configuration information associated with the process group, wherein the configuration information comprises importance information of the process group to indicate a characteristic of the process group, and wherein a priority of a queue associated with a high-importance process group is higher than a priority of a queue associated with a low-importance process group.

10. The computer device according to claim 9, wherein the importance information comprises information about an impact of the process included in the process group based on a user experience, and wherein a process group having great impact on user experience is more important than a process group having little impact on user experience.

11. The computer device according to claim 7, wherein the instructions are included in an operating system program.

12. A non-transitory computer readable storage medium, comprising a computer program, which, when executed by one or more processors, causes the one or more processors to:
  store a plurality of I/O requests into a plurality of queues, wherein a queue of the plurality of queues corresponds to a process group that comprises one or more processes, and wherein an I/O request of the plurality of I/O requests is stored in the queue corresponding to the process group associated with the I/O request;
  dispatch the plurality of I/O requests in the plurality of queues to an I/O device, wherein the plurality of queues comprises a high-priority queue and a low-priority queue, and wherein a quantity of I/O requests from the high-priority queue is greater than a quantity of I/O requests from the low-priority queue;
  determine an I/O request response speed of a highest-priority queue of the plurality of queues;
  decrease a size of another queue different from the highest-priority queue in response to the I/O request response speed of the highest-priority queue being less than or equal to a first threshold;
  increasing the size of the other queue in response to the I/O request response speed of the highest-priority queue being greater than a second threshold.

13. The non-transitory computer readable storage medium according to claim 12, wherein the queue is associated with a priority based on a characteristic of the process group associated with the queue.

14. The non-transitory computer readable storage medium according to claim 12, wherein the computer program, when executed by the one or more processors, further cause the one or more processors to:
  obtain configuration information comprising information indicating a characteristic of the process group; and
  configure a priority of each of the plurality of queues based on the configuration information, wherein the priority of each of the plurality of queues is based on the characteristic of the process group associated with each of the plurality of queues.

15. The non-transitory computer readable storage medium according to claim 12, wherein the computer program, when executed by the one or more processors, further cause the one or more processors to:
  determine a quantity of I/O requests stored in the highest-priority queue; and
  increase the size of the other queue in response to the quantity of I/O requests stored in the highest-priority queue being less than or equal to a third threshold.

16. The non-transitory computer readable storage medium according to claim 12, wherein the computer program, when executed by the one or more processors, further cause the one or more processors to obtain configuration information associated with the process group, wherein the configuration information comprises importance information indicating a characteristic of the process group, and wherein a priority of a queue associated with a high-importance process group is higher than a priority of a queue associated with a low-importance process group.

17. A computer device, comprising:
a memory configured to store instructions; and
a processor coupled to the processor and configured to execute the instructions, which cause the processor to be configured to:
  store a plurality of input/output (I/O) requests into a plurality of queues, wherein a queue of the plurality of queues corresponds to a process group that comprises one or more processes, and wherein an I/O request of the plurality of I/O requests is stored in the queue corresponding to the process group associated with the I/O request;

dispatch the plurality of I/O requests in the plurality of queues to an I/O device, wherein the plurality of queues comprises a high-priority queue and a low-priority queue, and wherein a quantity of I/O requests from the high-priority queue is greater than a quantity of I/O requests from the low-priority queue;

determine a quantity of I/O requests stored in a highest-priority queue of the plurality of queues; and increase a size of another queue different from the highest-priority queue in response to the quantity of I/O requests stored in the highest-priority queue being less than or equal to a threshold.

* * * * *

UNITED STATES PATENT AND TRADEMARK OFFICE
CERTIFICATE OF CORRECTION

PATENT NO. : 10,628,216 B2
APPLICATION NO. : 16/401977
DATED : April 21, 2020
INVENTOR(S) : Xie Miao, Jiang Zhong and Kaixu Xia It is certified that error appears in the above-identified patent and that said Letters Patent is hereby corrected as shown below:

On the Title Page

(54) Title and in the Specification, Column 1 Line 4:
"Based on Hige or Low Priority"
Should read:
"Based on High or Low Priority"

Signed and Sealed this
Twenty-third Day of June, 2020

Andrei Iancu
*Director of the United States Patent and Trademark Office*